United States Patent Office 2,778,809
Patented Jan. 22, 1957

2,778,809

METHOD AND COMPOSITION FOR THE IMPROVEMENT OF SOIL STRUCTURE

Dorsey R. Mussell, Clare, and Harold H. Roth, Bay City, Mich., assignors to The Dow Chemical Company, Midland, Mich., a corporation of Delaware No Drawing. Application January 2, 1953,
Serial No. 329,445

8 Claims. (Cl. 260—41)

This invention is concerned with the improvement of soil structure and is particularly directed to a method, an improved soil composition and a treating composition for improving soil structure.

It is now recognized that the chemical constitution of the mixture of organic and mineral constituents which go to make up a soil is not the only determining factor as to whether or not the soil is adapted to tillage operations and the growing of crops. The physical structure of the soil is a further important and frequently determinative factor in soil management. Most unmodified soils have at least some of their individual particles clustered into aggregates. The size distribution of these aggregates, with the resultant size distribution of the pore spaces between them, determines the soil structure.

Soil structure is of importance in the evaluation of soil in areas under cultivation. In such soil, if there is little or no tendency to aggregation into crumbs, the clay particles of the soil generally disperse rapidly in rain water to form a sticky mud, relatively resistant to further absorption and penetration of water. This results in increased run-off during heavy rains with attendant erosion. Furthermore, unaggregated soils, on drying, tend to form hard crusts or large clods at the surface and densely consolidated layers (clay hardpan) below the surface.

On the other hand, a soil characterized by a high percentage of aggregates, particularly when a major proportion of the crumbs are stable when wet and have diameters of 0.25 millimeter and above, will generally absorb incident rainfall rapidly and allow it to percolate down to and into the sub-soil. Such soils, having good crumb structure, are less sticky when wet and when dry provide a surface mulch of aggregates which offer minimum resistance to the emergence of crop seedlings and maximum resistance to the erosive effects of dry winds. It has been found that soils having a good crumb structure have improved water-holding capacity and may be cultivated without adverse effects sooner after a heavy rain, and for a longer time during dry seasons, than would otherwise be the case.

It is an object of the present invention to provide a method for improving the physical condition of soils. Another object is to provide soil compositions characterized by a stable crumb structure, better drainage, increased aeration and/or improved water-holding capacity. A further object contemplates the provision of novel soil treatment materials. Other objects will become apparent from the following specification and claims.

According to the present invention, it has been found that water-soluble sulfonates of poly(alkenyl-aromatic) compounds when incorporated in soils of poor physical structure at a concentration of at least 0.003 percent by weight of the soil, cause marked improvement in the structure and workability thereof. The term "sulfonate" as employed herein refers both to the water-soluble free sulfonic acid compounds obtained by sulfonation of appropriate polymers and copolymers and to the water-soluble salts of such acids.

In soils treated according to the invention, a large proportion of the clay particles appear to be bound together to form relatively water-stable aggregates. It is among the advantages of the invention that the treated soils remain crumbly and friable even at high moisture content, percolation of rainfall into and through the soil is increased, aeration is improved and the soil has improved water-holding capacity. It is a further advantage that soils treated as set forth above show a decreased tendency to puddling when wet and crusting and cracking when dry. Yet another advantage resides in the chemical stability of the sulfonates with resultant effectiveness for soil improvement over long periods of time.

Sulfonated poly(alkenyl-aromatic) compounds suitable for use in the practice of the invention include water-soluble sulfonates characterized by little or no sulfone cross-linking. By "sulfone cross-linking" is meant the linking together of two different molecules of the poly-(alkenyl-aromatic) compound through a sulfone group. The desired sulfonates may be prepared by the controlled sulfonation of the solid polymers of styrene, α-methyl-styrene, ar-vinyltoluene, ar-vinylxylene, ar-ethylstyrene and copolymers of any two or more of such compounds with one another.

In one method of preparation of the desired sulfonates a solid polymer or copolymer of the aforementioned class is dissolved in a mixture consisting essentially of from 20 to 80 percent by weight of liquid sulfur dioxide, the remainder being one or more of the compounds methyl chloroform, methylene chloride, ethylene chloride, carbon tetrachloride and tetrachloroethylene. The solution thus formed may contain 5 percent by weight or less, preferably from 0.5 to 2 percent of the polymeric substance which is to be sulfonated. The solution is stirred and maintained at temperatures between −20° and 40° C. and a solution containing 5 percent by weight or less of freshly prepared sulfur trioxide in a separate portion of the aforementioned mixed solvent, or in one of the ingredients of the mixed solvent, is added with stirring. The addition is made quite rapidly over a period of from 1 to 20 minutes and the reaction is carried out under sufficient pressure to maintain a major portion of the solvent mixture in liquid condition. Sufficient sulfur trioxide is employed to provide a proportion corresponding to that theoretically required for the introduction of between 0.7 and 1.1 sulfonic acid radical per aromatic nucleus of the polymer under treatment. Upon completion of the reaction, the sulfonate precipitates from the reaction medium as a granular solid and may be separated by conventional procedures such as filtration, washing with fresh portions of the solvent mixture and drying.

The above described method is disclosed and claimed in the copending application of Harold H. Roth, Serial No. 272,888, filed February 21, 1952, now U. S. Patent 2,691,644. Any other suitable method may be employed for the preparation of the sulfonates provided only that the latter be characterized by the ability to improve the condition of the soil in accordance with the invention as set forth herein.

The sulfonates may, in general, be separated in the free sulfonic acid form from the reaction medium in which they are produced. Such products may be employed directly in the practice of the invention or, if desired, the sulfonic acid form may be dissolved in water and reacted with suitable basic materials to produce water-soluble sulfonates in the form of salts. For example, the free sulfonic acid form may be reacted with ammonia, lithium carbonate, sodium bicarbonate, potassium hydroxide or calcium hydroxide to produce the corresponding ammonium, lithium, sodium, potassium and calcium salts, respectively. Other water-soluble salts are prepared in similar fashion.

Sulfonates operable in the invention have Brookfield viscosities of from about 35 to 1000 centipoises and preferably of from about 50 to 500 centipoises and are prepared from poly(alkenyl-aromatic) compounds having a solution viscosity above 100 centipoises and preferably above 500 centipoises. The term "Brookfield viscosity" as used herein refers to the viscosity of an aqueous 0.55 percent by weight solution of the sodium salt form of the sulfonate as determined with the Brookfield viscometer using the No. 1 spindle at 6 revolutions per minute (Leaman, Rubber Age, vol. 69, pages 702–703). The term "solution viscosity," as used in the present specification and claims, means the viscosity at 25° C. of a 10 percent solution of the polymeric material in toluene as determined with a modified Ostwald viscosimeter (1949, A. S. T. M. Standards, Part 6, pp. 478–479).

Sulfonates prepared from poly(alkenyl-aromatic) compounds of the benzene series having solution viscosities of at least 500 centipoises and especially those containing in chemically combined form at least 50 mole percent of vinyltoluene have proved particularly advantageous and methods and compositions employing such sulfonates constitute a preferred embodiment of the invention.

In carrying out the invention, the sulfonate is intimately dispersed through the desired depth of soil. In one method of operation, the sulfonate is dissolved in water and sprayed over the surface of the freshly fitted soil. Alternatively, where surface irrigation is used the sulfonate is dissolved in the irrigation water and thereby carried over and into the soil to be treated. In a further method, the dry sulfonate in finely divided form or a pulverulent composition thereof with or without carrier is dusted or drilled on or into the upper layers of the soil. In any case, it is desirable that the application be followed as soon as possible by a discing, dragging or harrowing operation in order to distribute the sulfonate as uniformly as possible and to the desired depth in the soil. In such operations, it is frequently preferred to distribute the sulfonate through the upper three to six inches of the soil. However, depending upon the characteristics of the soil and the results desired, greater or less depths of soil may sometimes be treated.

In yet another mode of operation, the sulfonate may be applied to a relatively thin cross-section of the soil. For example, where the primary object is to aid the emergence of a crop by preventing the formation of a hard crust, only the upper ¼ to 1 inch of the soil may be treated. Similarly, with localized problems such as plowsole hard-pans, the sulfonate may be distributed in the bottom of the furrow immediately following the plow.

In practice, the amount of sulfonate to be used is dependent on the type of soil concerned and the specific purpose of the treatment. In general, it is only necessary that sufficient of the sulfonate is employed in the soil to accomplish the desired result as regards increased aggregation and improvement in soil structure. Desirable results have been obtained when employing the sulfonates at concentrations of from about 0.005 to 1.0 percent by weight of the soil. A preferred embodiment of the invention is a composition which comprises soil and in intimate mixture therewith, from about 0.02 to 0.5 percent by weight of a sulfonate as described above.

The sulfonates may be intimately dispersed on finely divided solid carriers to provide dust compositions. In preparing such compositions, the dried sulfonate may be mechanically mixed with one or more of the carriers and ground in a hammermill, air-reductionizer or the like. Alternatively, when employing sulfonates manufactured in finely powdered form it suffices to mix such product intimately with the finely divided carrier. Suitable finely divided solid carriers include diatomaceous earth, volcanic ash, gypsum, talc, wood flour, inorganic fertilizer materials and clays such as bentonite, fuller's earth and kaolinite. In general, from about 5 to 75 percent by weight of the sulfonate is employed in such dust composition and it is preferred to use from about 20 to about 40 percent by weight of the active sulfonate compound.

In a further method of preparing dust compositions, diatomaceous earth or a mixture of diatomaceous earth and finely divided clay is admixed with a solution of the sulfonate with stirring and the resulting mixture dried. Such mixtures can thereafter be ground or sieved, if desired. The amount of water or other solvent employed is not important provided only that sufficient solvent is used to facilitate the uniform distribution of the sulfonate on the carrier. The proportions of sulfonate and carrier are regulated so as to obtain a finished dust having a composition within the limits set forth above.

Representative copolymer sulfonates which are adapted to be employed in accordance with the present invention include those embodying significant molar proportions each of styrene and ar-vinyltoluene, ar-vinyltoluene and ar-vinylxylene, styrene and ar-vinylxylene, styrene and ar-ethylstyrene, ar-vinyltoluene and styrene and ar-vinylxylene, and the like.

The following examples illustrate the invention but are not to be construed as limiting the same.

*Example 1*

Miami silt loam soil, known to be subject to severe compaction and puddling in the field, was air-dried and sieved through a 10 mesh screen. 0.15 gram portions of various sulfonates of a copolymer of equimolecular proportions of styrene and ar-vinyltoluene were individually dissolved in 30 milliliter portions of water. The resulting solutions were mixed with stirring with separate 300 gram portions of the dry, sieved soil to provide soil compositions containing 0.05 percent by weight of the respective sulfonates. Each treated portion of soil was placed in a standard soil tube having a 1⅞ inch inside diameter and gently tamped to obtain a soil column of 6 inches in depth. The columns so prepared were wetted to saturation and allowed to stand for 72 hours. Thereafter a constant head of water was maintained over the soil columns for a period of 24 hours and the rate of percolation of water through the soil was determined. An untreated portion of the Miami soil was submitted to the same procedure to serve as a control. The results obtained, together with the characterization properties of the sulfonates, are listed in the following table:

| Sulfonate No. | Brookfield Viscosity of Sulfonate in Centipoises | Solution Viscosity in Centipoises of the Copolymer | Percolation Rate, Milliliters Per Hour |
| --- | --- | --- | --- |
| 1 | 7 | 10 | 34 |
| 2 | 35 | 100 | 153 |
| 3 | 100 | 100 | 114 |
| 4 | 130 | 694 | 537 |
| 5 | 184 | 694 | 1,356 |
| 6 | 320 | 694 | 1,115 |
| 7 | 540 | 694 | 591 |
| 8 | 940 | 694 | 77 |
| 9 | 4,180 | 694 | 27 |
| Untreated Control | | | 16 |

*Example 2*

Upon completion of the percolation determination in Example 1, the soil samples were allowed to drain for 16 hours and removed from the tubes. A 200 gram portion of each of the wet soil samples was separately placed on a standard 14 mesh sieve (Tyler sieve series) superimposed on a 32 mesh sieve. The sieve combination was then agitated for a period of about 2 minutes in a tank of water until all of the fine non-aggregated soil was screened out. By this procedure water-stable aggregates having diameters of 0.5 millimeter or greater were retained on the screens. These aggregates were allowed to drain for 5 minutes and weighed. The results are reported in the following table as percent by wet weight of the soil.

| Sulfonate No. | Percent Aggregates |
|---|---|
| 1 | 16 |
| 2 | 34 |
| 3 | 42 |
| 4 | 49.5 |
| 5 | 42 |
| 6 | 40.5 |
| 7 | 35 |
| 8 | 30 |
| 9 | |
| Untreated Control | 13 |

Example 3

A sulfonate having a Brookfield viscosity of 69 centipoises was prepared from a poly(vinyltoluene) having a solution viscosity of 547 centipoises. A portion of the sulfonate was dissolved in water and admixed with Miami silt loam soil to prepare a soil composition containing 0.05 percent by weight of the sulfonate and about 10 percent moisture. Determination of the percolation rate was carried out according to the procedure of Example 1. The percolation rate was found to average 775 milliliters per hour for a period of 8 hours as compared to an average rate of 20 milliliters per hour for the untreated control. Sieving of the soil by the method of Example 2 showed 39 percent by weight of aggregates having diameters of at least 0.5 millimeter in the soil containing the sulfonate as compared to 13 percent by weight of aggregates in the untreated control soil.

Example 4

Varying amounts of the sulfonate No. 5 of Example 1 were admixed with soil to provide a series of compositions containing 0.04, 0.02, 0.01, and 0.005 percent by weight of sulfonate. Percolation determinations were carried out by the procedure of Example 1 with the following results:

| Concentration of Sulfonation Product | Percolation Rate, Milliliters Per Hour |
|---|---|
| 0.04 | 1,707 |
| 0.02 | 1,280 |
| 0.01 | 81 |
| 0.005 | 57 |
| Untreated Control | 17 |

Example 5

Further determinations by the procedure of Example 1 gave percolation rates of over 100 milliliters per hour for soil compositions containing 0.03 to 0.05 percent by weight of the following water-soluble sulfonates in salt form.

| Cation of Salt | Brookfield Viscosity in Centipoises | Base Polymer | Solution Viscosity in Centipoises |
|---|---|---|---|
| Ca++ | 190 | Polystyrene | [1] 100 |
| NH4+ | 115 | 50-50 copolymer of styrene and vinyltoluene | 100 |
| Ca++ | 115 | ...do... | 100 |

[1] This base polymer was a composite which included some material of lower solution viscosity.

In a similar fashion, other water-soluble sulfonates in salt form, such as the sodium, lithium and potassium salts, are employed with comparable improvement in soil structure. The sulfonates of the invention act as cation-exchange agents with the result that salts thereof containing cations essential to the nutrition of plants, as for example, the potassium and ammonium salts, serve as fertilizers in addition to their function as soil conditioners.

Example 6

A copolymer of equimolecular proportions of styrene and vinyltoluene having a solution viscosity of 694 centipoises was sulfonated with sulfur trioxide in a liquid sulfur dioxide-chlorinated hydrocarbon medium as previously described to produce a water-soluble sulfonate. The latter was separated from the reaction medium by filtration and washed with diethyl ether to obtain a purified product in the form of a finely divided powder having a Brookfield viscosity of 176.

25 parts by weight of the finely-divided sulfonate (as the acid) was mechanically mixed with 75 parts of Diluex (an attapulgite-type clay) and the mixture triturated to pass a 100-mesh screen. The resulting dust composition was admixed with a dry soil in the proportions of 2 parts by weight of the former to 1000 parts of soil to produce a conditioned soil containing 0.05 percent by weight of the sulfonate. 300 grams of this soil composition was moistened to a 10 percent moisture content, allowed to stand for 96 hours and submitted to a percolation determination as in Example 1. The average percolation rate was found to be 354 milliliters per hour.

Example 7

Equal weights of the sulfonate of Example 6 and a commercial 4-8-4 fertilizer are mechanically mixed together and ground to pass a 100-mesh screen. The resulting composition is distributed over an area of freshly fitted soil, normally subject to puddling and the formation of hard crusts, at the rate of 800 pounds of the composition per acre. A disc and drag combination is used to admix the applied composition through the upper 3 inches of the soil. Marked improvement of the soil texture results throughout the subsequent growing season.

We claim:

1. A composition for the treatment of soil which comprises a finely divided solid carrier and in intimate admixture therewith a water-soluble sulfonate of a poly(alkenyl-aromatic) compound, said poly(alkenyl-aromatic) compound having a solution viscosity before sulfonation of at least 500 centipoises and said sulfonate having a Brookfield viscosity of from about 35 to 1000 centipoises.

2. A composition for the treatment of soil which comprises a finely divided solid carrier and in intimate admixture therewith a water-soluble sulfonate of a poly(alkenyl-aromatic) compound, said sulfonate being employed in the amount of from about 5 to 75 percent by weight of the composition, said poly(alkenyl-aromatic) compound having a solution viscosity before sulfonation of at least 500 centipoises and said sulfonate having a Brookfield viscosity of from about 35 to 1000 centipoises.

3. A composition for the treatment of soil which comprises a finely divided solid carrier and in intimate mixture therewith from about 5 to 75 percent by weight of a water-soluble sulfonate of a poly(alkenyl-aromatic) compound of the benzene series, said poly(alkenyl-aromatic) compound having a solution viscosity before sulfonation of at least 100 centipoises and said sulfonate having a Brookfield viscosity of from about 35 to 1000 centipoises.

4. A composition according to claim 3, wherein the poly(alkenyl-aromatic) compound embodies at least 50 mole-percent of ar-vinyltoluene.

5. In the method for improving soil structure which comprises distributing in the soil a water-soluble sulfonate of a poly(alkenyl-aromatic) compound, the improvement which comprises employing a sulfonate derived from a poly(alkenyl-aromatic) compound having a solution viscosity before sulfonation of at least 100 centipoises for a ten percent solution of the polymeric material in toluene at 25° C. and said sulfonate having a Brookfield viscosity of from about 35 to 1000 centipoises.

6. A method according to claim 5, wherein the poly-(alkenyl-aromatic) compound is a polymer of at least one alkenyl-aromatic compound of the benzene series, said polymer having a solution viscosity before sulfonation of at least 500 centipoises.

7. A method according to claim 6, wherein the polymer embodies at least 50 mole percent of ar-vinyltoluene.

8. A method according to claim 6, wherein the sulfonate is characterized by a Brookfield viscosity of from 50 to 500 centipoises.

References Cited in the file of this patent

UNITED STATES PATENTS

| | | |
|---|---|---|
| 2,533,211 | Baer | Dec. 12, 1950 |
| 2,612,485 | Baer et al. | Sept. 30, 1952 |
| 2,625,529 | Hedrick et al. | Jan. 13, 1953 |